A. L. HALLBAUER.
ROOT GRUBBING MACHINE.
APPLICATION FILED NOV. 7, 1910. RENEWED NOV. 18, 1913.
1,089,361.
Patented Mar. 3, 1914
4 SHEETS—SHEET 4.
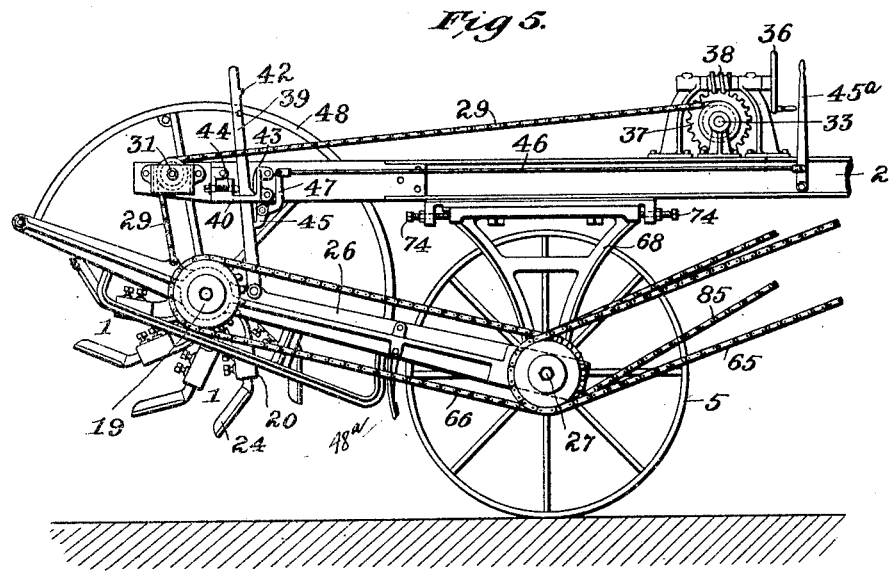
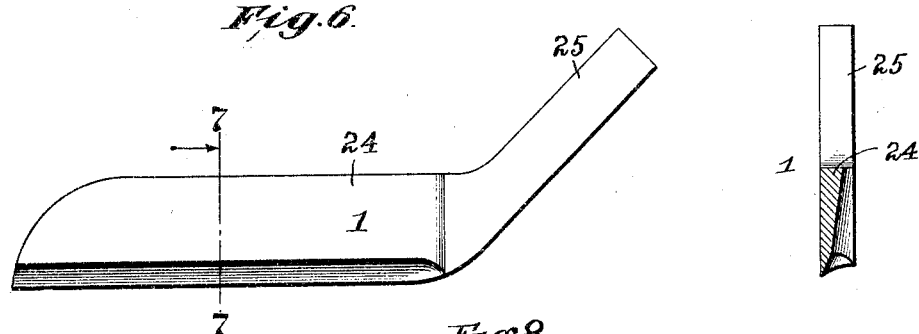
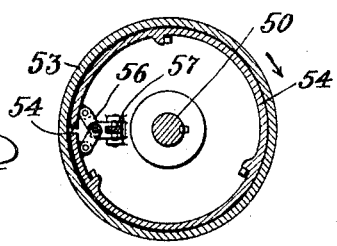
Witnesses:
Inventor

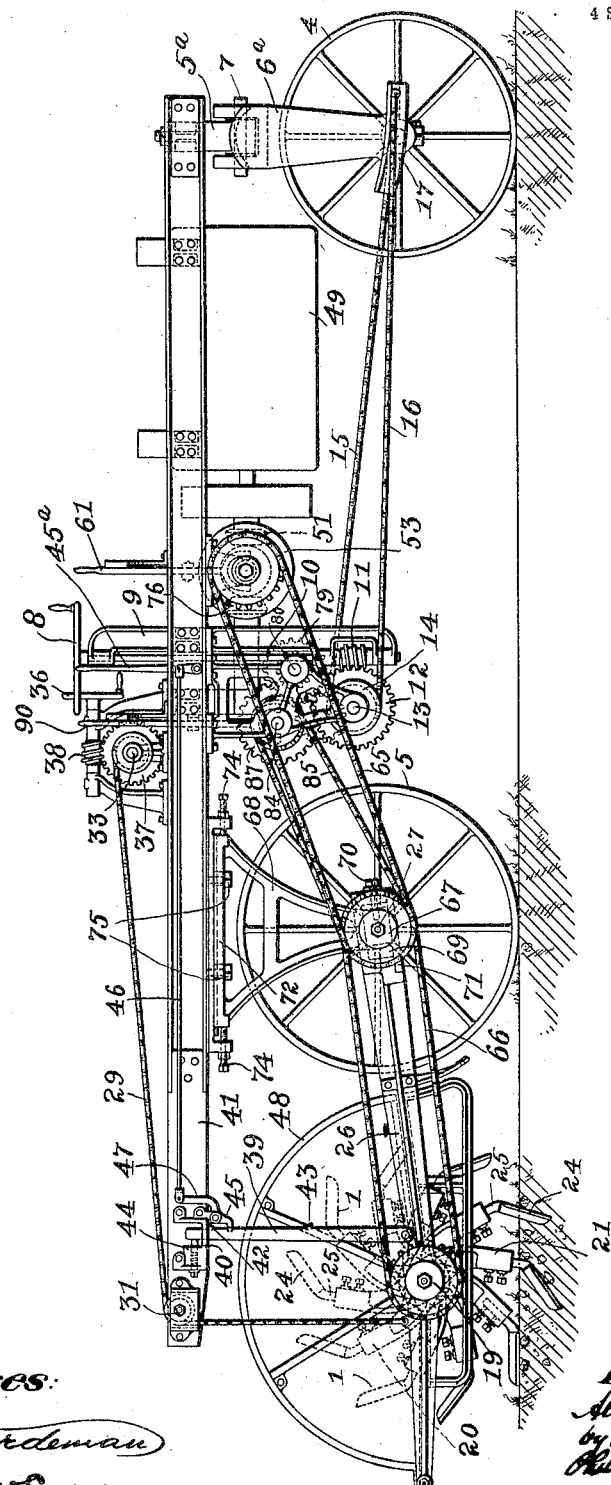

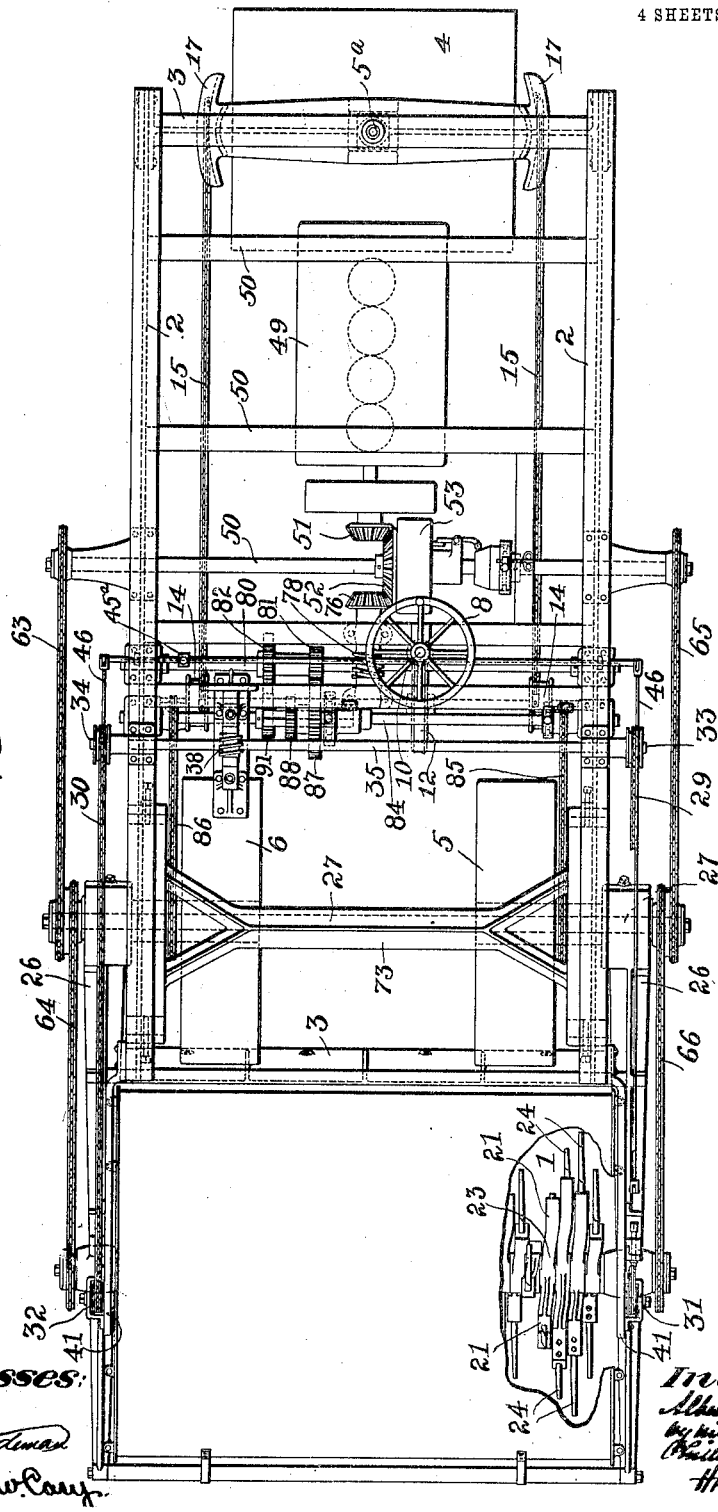

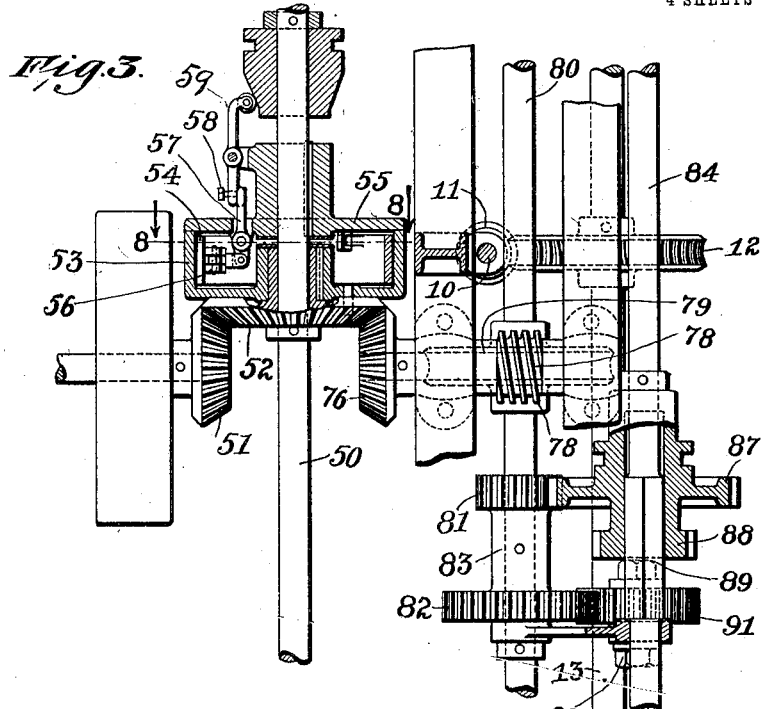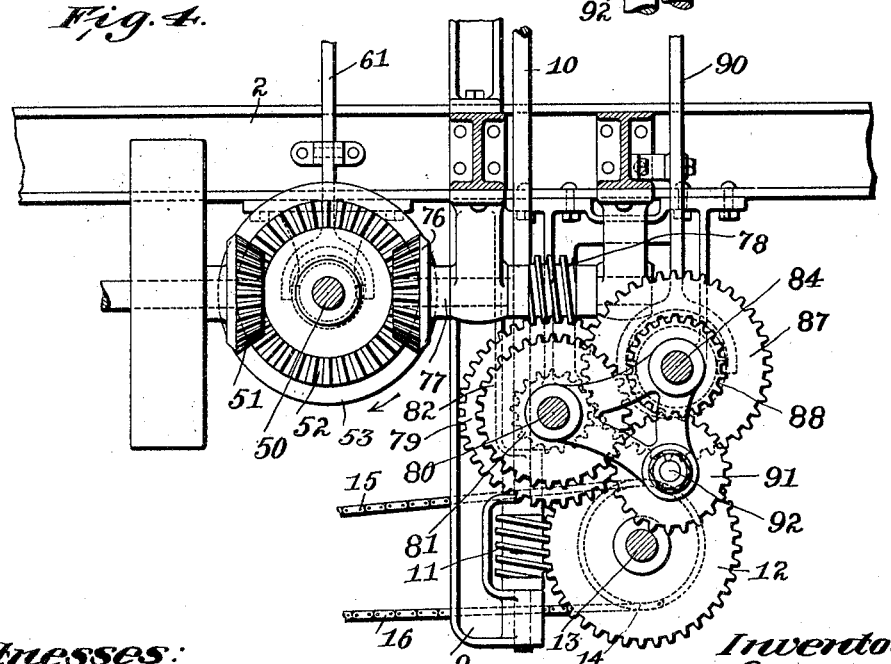

UNITED STATES PATENT OFFICE.

ALBERT L. HALLBAUER, OF BEVERLY, MASSACHUSETTS, ASSIGNOR, BY DIRECT AND MESNE ASSIGNMENTS, TO PALMETTO MACHINE COMPANY, INCORPORATED, OF BALTIMORE, MARYLAND, A CORPORATION OF MARYLAND.

ROOT-GRUBBING MACHINE.

1,089,361. Specification of Letters Patent. Patented Mar. 3, 1914.

Application filed November 7, 1910, Serial No. 591,014. Renewed November 18, 1913. Serial No. 801,746.

*To all whom it may concern:*

Be it known that I, ALBERT L. HALLBAUER, a citizen of the United States, residing at Beverly, in the county of Essex and State of Massachusetts, have invented certain new and useful Improvements in Root-Grubbing Machines; and I do hereby declare the following to be a full, clear, and exact description of the invention, such as will enable others skilled in the art to which it appertains to make and use the same.

The present invention relates to certain new and useful improvements in root grubbing machines and more particularly to that type of root grubbing machine which is adapted to cut into small pieces vines and roots lying upon, or adjacent to, the surface of the ground.

There are comparatively large areas of untilled land in the southeastern part of the United States which can be readily put in cultivation if the masses of creeping stems and vines which cover the ground are removed. If this vegetation, which consists largely of creeping palmetto stems, is cut up into small pieces it will rot away in a comparatively short time and serve to enrich the soil, leaving it ready for cultivation. The stems can easily be removed from the land if desired and disposed of by burning or otherwise. The character of the soil in this part of the country is sandy and contains practically no stones.

The object of the present invention is to provide a machine which will cut all the creeping stems and vines which lie upon the surface of the ground and which are embedded in the ground a short distance below the surface and at the same time thoroughly loosen the surface soil and throw the roots embedded in the ground to the surface.

With this end in view one feature of the invention contemplates the provision of a plurality of power driven knives which operate with a downward slashing movement to cut the creeping stems. The knives are mounted upon a traction vehicle which moves slowly along the surface of the ground as the knives are operated. After the vegetation upon the surface has been cut the knives are further forced into the ground to cut the roots beneath the surface and thoroughly loosen the surface soil.

A further object of the invention is to provide an improved traction vehicle upon which the knives are mounted and which may be used as a road roller or leveler in conjunction with the knives or not as desired.

With this end in view a further feature of the invention contemplates the provision of a traction vehicle supporting the knives and mounted for movement upon a plurality of heavy rolls which thoroughly level the surface of the ground throughout the entire width of the vehicle. The knives are supported upon the vehicle so that they may be raised into an inoperative position and clear the surface of the ground when it is desired to employ the vehicle simply for leveling or when it is desired to move the vehicle from one place to another without operating the knives. Mechanism is also provided for greatly increasing the speed of the vehicle when moving from one place to another with the knives in an inoperative position.

A still further object of the invention is to provide an improved mounting for the knives and mode of operation of the same which will enable the knives to successfully cut the largest stems which may be encountered and at the same time withstand any shock which may be given to them due to the cutting operation.

With this end in view a rotatable knife shaft is provided having a plurality of knives supported thereon. The knives are arranged in a spiral formation about the shaft and each knife is detachably mounted in a knife holder and supported with its cutting edge substantially parallel to the surface of the ground during the cutting operation.

Still further features of the invention will be fully described in the accompanying specification and defined in the claims.

In the drawings illustrating the preferred form of the invention Figure 1 is a side elevation of the improved root grubber showing the knives in their working position, Fig. 2 is a plan view of the root grubber looking down upon the same; Fig. 3 is a detail showing a plan view of the transmission gearing with certain parts cut away and shown in section; Fig. 4 is a detail showing an elevation of the gearing illustrated in Fig. 3; Fig. 5 is a detail illustrating the supporting frame for the knives and the means for raising and lowering the knives, the knives being shown in their raised or inoperative position; Fig. 6 is a detail showing a side view of one of the knife blades removed from its holder; Fig. 7 is a section of the knife taken upon the line 7—7, Fig. 6, looking in the direction of the arrow; Fig. 8 is a section of the clutch taken upon the line 8—8, Fig. 3.

The root grubbing machine, which consists essentially of a plurality of rapidly rotating knives is supported upon a traction vehicle of a rigid heavy construction. The traction vehicle is mounted upon heavy rolls or wheels which serve to level the ground and the knives are supported upon one end of the vehicle and may be raised or lowered as desired into either an inoperative or an operative position respectively. Locking mechanism is provided for positively retaining the knives in either the operative or inoperative position and a trip mechanism under the control of the operator is employed for disengaging the locking means when the knives are to be raised or lowered. A suitable type of motor is mounted upon the traction vehicle in order to drive the vehicle and operate the knives and the motor is connected with the driving rolls and knife shaft through suitable clutches and transmission gearing in order that the operation of the knives and the movement of the vehicle may be under the control of the operator. It is intended that when the knives are operated the vehicle shall be driven slowly with the knives located at the front end of the machine. When it is desired, however, to merely move the machine rapidly from one place to another with the knives raised out of operation, the direction of travel of the machine is reversed through the transmission gearing and the vehicle is driven in the opposite direction at a greatly increased rate of speed. These two speeds may be conveniently referred to as the operative speed and traveling speed respectively. If it is desired to operate the vehicle merely as a road roller the knives may be raised into an inoperative position and the vehicle driven at the slow speed.

In the illustrated embodiment of the invention a plurality of knives 1 are supported upon a traction vehicle which comprises a rigid frame having side members 2 and end members 3 bolted together, the members preferably comprising a plurality of channel irons of suitable size. The frame is mounted upon a front roll 4 and side rolls 5 and 6, each of the rolls being formed of cast iron and having a broad heavy rim to level the surface of the ground. The front roll 4 is of sufficient breadth to overlap the rolls 5 and 6 and bear upon and level the ground throughout the entire width of the machine. The vehicle is guided by turning the front roll 4, which is pivotally connected to the front end of the frame by a vertical pin 5$^a$ journaled in the end member 3, the pin 5 being pivotally connected at its lower end to a pair of forked arms 6$^a$ by means of a horizontal pin 7. The roll 4 is journaled between the lower ends of the forked arms 6 and this connection allows the front roll to be turned and at the same time tipped when passing over an obstruction without raising and tipping the entire machine. The movement of the front roll to guide the machine is controlled by a hand wheel 8, which is journaled upon a vertical bracket 9, fixed to the frame of the machine. The movement of the hand wheel 8 is communicated to the front roll 4 through a vertical shaft 10 fixed to the hand wheel and provided upon its lower end with a worm 11 meshing with a worm wheel 12, which is mounted upon a horizontal shaft 13 journaled in the frame of the machine. The shaft 13 has a pulley 14 fixed thereto at each end. The pulleys 14 have the ends of the chains 15 fastened at diametrically opposite points to their peripheries and the chains are respectively connected at their opposite ends to the curved segments 17 formed upon the lower portion of the forked arms 6 so that a rotation of the hand wheel 8 will turn the front roll 4 correspondingly.

As stated previously, the root grubber comprises essentially a plurality of knives mounted upon a rotary shaft and having their cutting edges projecting obliquely to the knife holders in order that the edge of the blade shall be substantially parallel to the surface of the ground when in contact therewith. By arranging the blades in this manner, the most efficient result is obtained, as the blade of the knife is moving in a substantially vertical downward direction during the cutting operation with just sufficient movement of the knife in a horizontal direction to give a slight draw stroke and enable a slashing cut to be given. The vegetation to be cut consists mainly of creeping stems of palmetto trees which lie along the surface of the ground or just beneath the surface and a downward stroke of the knives is more efficient than any other because the stems of the trees are supported from beneath and cannot be pushed out of the way when the knives strike them upon the upper side. The knives contact with the surface of the ground before they have reached the limit of their downward movement, as can be clearly seen from an inspection of Fig. 1 and the knives are then forced through the surface soil to thoroughly loosen the soil and at the same time cut the roots which are embedded in the ground to a depth of about 8 to 10 inches and throw them to the surface. The knives are arranged to cut the roots into pieces preferably about one inch in length and are forced into the ground to a depth of nearly a foot. By cutting the roots into small sections, they may be left upon the surface of the ground, where they will rot in a short time and fertilize the soil. The soil is sandy and contains practically no stones, so that there is no danger of nicking or dulling the cutting edges of the knives from this source. The knives 1 are mounted upon a rotary shaft 19 in a series of holders 20. Each holder 20 is provided with a pair of curved arms 21, which are mounted upon a hub 23 keyed to the shaft 19. The arms of the holders 20 are laterally offset from one another in order that the knives, which are held in the opposite ends of the arms, will be spaced apart laterally and cut at different points. Each knife 1 comprises a broad tapering blade 24 projecting obliquely from a rectangular shank 25 which is detachably supported in a socket formed in the end of each of the arms 21 and held in place by set screws. It will be seen that the blades of the knives when placed on the shaft have their cutting edges facing outwardly and that the cutting edges extend at an angle to the radii of the shaft.

The knives 1 are arranged in a spiral formation about the rotary shaft and it is preferred to provide three complete convolutions of knives which extend throughout the entire length of the shaft. In order to support the knives in this manner the holders 20 are progressively stepped about the shaft so that the arms of each succeeding holder are angularly advanced through an angle of approximately 36° as shown clearly in Figs. 1 and 2. With this arrangement there will be at all times three knives evenly spaced from one another which are in operation. The knives, however, are rotated so much faster than the movement of the vehicle longitudinally that all of the knives will be brought into operative engagement with any one stem before the machine has moved beyond it. In order that the knives may be raised or lowered as desired the rotary shaft 19 is journaled in a frame comprising a pair of arms 26 which are pivotally supported at their inner ends upon a shafts 27. A pair of chains 29 and 30 are respectively connected to the opposite arms 26 and pass over the pulleys 31 and 32, supported in the outer ends of arms 41 and to pulleys 33 and 34 which are mounted upon opposite ends of the shaft 35. The shaft 35 is rotated to raise or lower the knife shaft by a hand wheel 36 operatively connected to the shaft 35 through a worm wheel 37 and worm 38. In order that the knives may be locked against upward displacement when in an operative position or against downward movement when they are in an inoperative position, a locking mechanism is provided which normally retains the knives in either their raised or lowered position but which may be readily disengaged by a trip mechanism under the control of the operator. The locking mechanism comprises a lever 39 which is pivoted upon one of the arms 26 and extends upwardly through the slotted portion of a bracket 40 fastened to one face of the rearwardly extending arm 41, bolted to one of the side members 2. The lever 39 is provided with two laterally projecting lugs 42 and 43 which are adapted to engage with the edge of the slot formed in the bracket 40 and lock the lever 39 in position. The lever 39 is normally forced against one edge of the slot by a spring-pressed pin 44 slidably mounted in the bracket 40 adjacent to the upper end of the lever 39. When the knives are in operative position, the lug 42 will contact with the under face of the bracket 40 and prevent any upward displacement of the knives during the cutting operation. When the knives are raised into an inoperative position, however, the lug 43 will contact with the upper face of the bracket 40, as shown clearly in Fig. 5, and lock the knives in their raised position. In order that the locking means may be readily disengaged to move the knives into and out of operative position, a trip 45 is pivotally mounted upon the bracket 40 adjacent one edge of the lever 39, and is oscillated to move the lever against the action of the spring pressed pin 44 by a hand lever 45ª mounted upon the vehicle frame, and connected to the trip by a rod 46 and a link 47. Upon releasing the hand lever 45ª, the spring pressed pin 44 immediately forces the lever 39 to one side and locks the lever upon engagement of either the lug 42 or 43 with the bracket 40. A guard is mounted above the revolving knives in order to prevent the cuttings and dirt which are necessarily thrown up by the knives, from flying in all directions. The guard comprises a semi-cylindrical casing 48 which is supported between the arms 26 in any suitable manner. A depending bracket 48ª is fastened between the arms 26 in front of the guard and is adapted to support a flexible apron (not shown) which hangs down with its edge nearly touching the surface of the ground and levels the heaps of cuttings which are thrown up by the knives.

The rotary knife shaft and the traction vehicle are both operated by the one motor and suitable clutch means are provided under the control of the operator for disconnecting the knife shaft from the motor when desired. The motor for driving the traction vehicle and rotating the knives preferably comprises a gas engine 49 of suitable size, which is supported by the cross bars 50 located in one end of the vehicle frame. The gas engine is connected to rotate the jack shaft 50 through the bevel gears 51 and 52 and an improved clutch which locks the bevel gear 52 to the shaft 50. Owing to the weight of the moving parts and the speed at which they are run it is necessary to provide a clutch which will start the knives gradually as it is thrown in but will drive the knives at full speed when in operative position. This is accomplished by providing an annular ring 53 keyed to the hub of the bevel gear 52 and engaging upon its inner face with a split ring 54. The split ring 54 is mounted upon a supporting member 55 keyed to the shaft 50 and is locked against rotation relatively to the shaft by a plurality of laterally projecting lugs formed on the ring and supporting member. The ends of the split ring are forced apart to spread the ring and cause it to frictionally engage with the inner face of the annular ring 53 by a toggle 56 (shown clearly in Fig. 8) connecting the ends of the ring. The toggle is operated by a lever 57 pivoted upon the supporting member 56 and oscillated by a second lever 59 centrally pivoted upon the hub of the supporting member 55. The lever 59 is preferably provided with an adjusting screw 58 which is threadedly mounted in the lever 59 and bears upon the end of the lever 57 in order to compensate for wear in the operative parts of the clutch.

In order to provide for a longitudinal adjustment of the shaft 19 relatively to the shaft 27, the arms 26 are slidably supported at their inner ends upon laterally projecting portions 67 formed upon the lower ends of the side members 68. The laterally projecting portions 67 are seated in slots formed in the inner ends of the arms 26, and the arms 26 and projecting members 67 are connected by adjusting screws 70 and are clamped in adjusted position by plates 71 detachably mounted upon the lower sides of the arms 26 and frictionally engaging with the lower faces of the members 67. In order to provide for a longitudinal adjustment of the shaft 27 relatively to the shaft 50, the shaft 27 is journaled at each end in the side members 68 which are provided with dove-tailed upper faces 72 engaging with corresponding faces formed upon the cross member 73 fixed to the vehicle frame. The side members 68 are moved longitudinally of the member 73 by a plurality of adjusting screws 74 and are locked in any adjusted position by clamp bolts 75.

When the knives are in operation, it is desirable to drive the vehicle at a slow speed, but when the knives are inoperative and the vehicle is merely being moved from one place to another, a higher speed is preferable. For this purpose, transmission gearing is arranged between the gas engine and the driving rolls 5 and 6. The transmission gearing is adapted to drive the vehicle at a slow speed in what might be termed the forward direction when the knives are operating and at a speed about five times as great in the reverse direction when the knives are inoperative. The transmission gearing is connected to the continuously rotated bevel gear 52 by means of a bevel gear 76 mounted upon a stud shaft 77, which carries a worm 78 meshing with a worm wheel 79 mounted upon the shaft 80. The shaft 80 carries also a small gear 81 and large gear 82 mounted upon the sleeve 83, which is pinned to the shaft. A shaft 84 is supported parallel to the shaft 80 and is connected directly to the rolls 5 and 6 by the driving chains 85 and 86 respectively. A pair of gears 87 and 88, are slidingly mounted upon a squared portion 89 of the shaft 84, and the sliding movement is controlled by a hand lever 90, conveniently accessible to the operator. When it is desired to drive the vehicle forward at a slow speed, that is, with the knives at the front end of the machine, the gear 87 is moved into engagement with the gear 81, and the shaft 84 is driven directly from the shaft 80 through the two gears. When it is desired to disconnect the shaft 84 entirely from the shaft 80, the gears 87 and 88 are slid into an intermediate position between the gears 81 and 82, and when it is desired to drive the vehicle in the reverse direction at a comparatively high rate of speed, the gears are slid still further along until the gear 88 meshes with an idle gear 91 mounted upon a stub shaft 92 which is below the shaft 84 and parallel to it. The idle gear 91 permanently engages with the gear 82 and as the gear 88 is driven through the idle gear 97 the direction of rotation of the shaft 84 is now reversed, being through the gears 82, 91 and 88.

Although it is preferred to employ the specific construction shown and described, it is to be understood that the invention is not to be considered as limited to this construction but may be varied and modified within the scope of the appended claims.

Having thus described the nature and object of the invention, and the preferred form thereof, what is claimed is:—

1. A root grubbing machine having, in combination, a vehicle, rotatable means mounted on the vehicle, a plurality of knives mounted on the rotatable means with their cutting edges facing outwardly and extending at an angle to the radii of the rotatable means, and means for rotating said knives at a greater speed than the longitudinal movement of the vehicle, whereby the knives produce a draw cut when entering and passing through the ground.

2. A root grubbing machine having, in combination, a motor vehicle, rotatable means mounted on the vehicle, a plurality of knives mounted on the rotatable means with their cutting edges facing outwardly and extending at an angle to the radii of the rotatable means, and means for driving the knives of the vehicle at a greater speed than the longitudinal movement of the vehicle whereby the knives produce a draw cut when entering and passing through the ground.

3. A root grubbing machine having, in combination, a vehicle, rotatable means mounted on the vehicle, a plurality of knives closely arranged around the rotatable means with their cutting edges facing outwardly and extending at an angle to the radii of the rotatable means, and means for rotating said knives at a greater speed than the longitudinal movement of the vehicle whereby the knives produce a draw cut when entering and passing through the ground.

4. A root grubbing machine having, in combination, a vehicle, rotatable means mounted on the vehicle, a series of knives arranged in spiral formation about the rotatable means, the cutting edges of said knives facing outwardly and extending at an angle to the radii of the rotatable means, and means for rotating said knives at a greater speed than the longitudinal movement of the vehicle whereby the knives produce a draw cut when entering and passing through the ground.

5. A root grubbing machine having, in combination, a vehicle, rotatable means mounted on the vehicle, a plurality of knives mounted on the rotatable means with their cutting edges facing outwardly and extending at an angle to the radii of the rotatable means whereby the cutting edges will extend substantially parallel to the surface of the ground when in contact therewith, and means for rotating said knives at a greater speed than the longitudinal movement of the vehicle whereby the knives produce a draw cut when entering and passing through the ground.

6. A root grubbing machine having, in combination, a traction vehicle, means for cutting the roots, a supporting frame, means under the control of the operator for raising and lowering the frame, and locking mechanism for retaining the frame in any adjusted position comprising a lever supported on the frame, a slotted bracket fastened to the traction vehicle, the lever extending upwardly through the slotted portion of the bracket, a pair of lugs projecting laterally from one face of the lever and contacting with the edge of the slot to retain the lever in raised or lowered position, and trip mechanism under the control of the operator for disengaging the lugs, substantially as described.

7. A root grubbing machine having, in combination, a traction vehicle, means for cutting the roots, a supporting frame, means under the control of the operator for raising and lowering the frame, and locking mechanism for retaining the frame in any adjusted position comprising a lever supported on the frame, a slotted bracket fastened to the traction vehicle, the lever extending upwardly through the slotted portion of the bracket, a pair of laterally projecting lugs on one face of the lever adapted to engage with the edge of the slot, a spring pressed pin supported in the bracket and normally tending to force the lugs into engagement with the edge of the slotted portion, a trip mechanism under the control of the operator for moving the lever against the action of the spring pressed pin to disengage the lugs, substantially as described.

8. A root grubbing machine having, in combination, a vehicle, a knife shaft extending transversely of the vehicle, a plurality of knives mounted thereon and arranged with their cutting edges substantially parallel to the surface of the ground when in contact therewith, and means for positively actuating the knife shaft adapted to move the knives faster than the longitudinal movement of the vehicle, substantially as described.

9. A root grubbing machine having, in combination, a vehicle, a rotatable element extending transversely of the vehicle, a plurality of knives closely disposed along the length of the rotating element, with their cutting edges facing outwardly and extending at an angle to the radii of the rotatable element, and means for rotating said knives at a greater speed than the longitudinal movement of the vehicle, whereby the knives produce a draw cut when entering and passing through the ground.

ALBERT L. HALLBAUER.

Witnesses:
BURTON W. CARY,
ROSWELL F. HATCH.